United States Patent Office 3,419,515
Patented Dec. 31, 1968

3,419,515
ANHYDROUS POLYMER DISPERSIONS AND
PROCESS OF PREPARING SAID DISPERSIONS
Claude J. Schmidle, Hudson, Ohio, and George L. Brown,
Swampscott, Mass., assignors to Rohm & Haas Company, Philadelphia, Pa., a corporation of Delaware
No Drawing. Continuation-in-part of applications Ser. No. 88,631, Feb. 13, 1961, Ser. No. 88,632, Feb. 13, 1961, and Ser. No. 758,892, Sept. 4, 1958. This application Mar. 17, 1965, Ser. No. 440,590
4 Claims. (Cl. 260—33.6)

ABSTRACT OF THE DISCLOSURE

The present invention is concerned with addition polymer compositions that are particularly adapted for use as coating and impregnating compositions. It is particularly concerned with the production in a hydrocarbon medium of a dispersion of an addition polymer in the form of finely divided particles which are insoluble in the medium but dispersed therein in a condition of stability, especially against a mechanical action by a hydrophobic polymeric dispersing agent consisting essentially of a component of polymeric size formed of a polymeric precursor which is soluble in the medium and a component formed of polymerized monomer molecules of essentially similar chemical constitution to that of polymerized monomer molecules in the dispersed addition polymer to render this latter component preferentially soluble in the dispersed polymer, the precursor being a hydrocarbon-soluble polymer of at least 70% by weight of at least one vinyl ester of an aliphatic acid having 6 to 18 carbon atoms.

---

This application is a continuation-in-part of our copending applications Ser. No. 88,631, filed Feb. 13, 1961, Ser. No. 88,632, filed Feb. 13, 1961, now abandoned and Ser. No. 758,892 filed Sept. 4, 1958 and now abandoned.

Known compositions for coating and impregnating purposes include solutions of addition polymers in organic solvents or water and aqueous latices. Organic solvent solutions generally contain a polymer of low molecular weight which tends to provide properties of brittleness and lack of durability of coatings obtained in comparison to the properties obtainable with higher molecular weight polymers. When the polymers to be used in such solutions are made of moderate molecular weight, the solutions become extremely viscous and are difficult to apply. When such solutions are applied at customary concentrations such as in spraying, the coatings are frequently so thin that it may be necessary to make more than two applications to provide adequate thickness. Solvent solutions often require expensive solvents such as esters, ketones, and hydrocarbons of essentially aromatic character, and such solvents are often severely toxic.

In many cases aqueous solutions are simply out of the question because the nature of the polymer, to be soluble in water, must necessarily impart water-sensitivity to the coated or impregnated product. Of course, aqueous solutions also necessitate the use of polymers of relatively low viscosity and the disadvantages pointed out hereinabove in conjunction with the application of high viscosity solutions of relatively lower concentration which produce coatings of inadequate thickness in a single pass.

Use of emulsion polymers or aqueous latices of the polymer enable the application of polymers of high molecular weight. However, they have the disadvantage that it is impossible to incorporate in the polymers various monomers which are reactive toward water such as maleic anhydride, itaconic anhydride, methacrylic anhydride and isocyanto-ethyl acrylate. Furthermore the water has a high latent heat of evaporation and hence more heat is required for drying. This factor may be of the order of ten times in aqueous systems, as compared to aliphatic hydrocarbon systems. The application of aqueous systems over unprimed wood also often brings about undesirable effects, such as raising the grain which in turn produces a non-uniform finish. Light-weight fibrous materials such as extremely thin tissue or paper cannot be impregnated with an aqueous system because of disintegration.

It is an object of the present invention to provide a dispersion of an addition polymer in the form of fine particles insoluble in hydrocarbon whereby the disadvantages of organic solvent solutions and aqueous compositions heretofore used for coating and impregnating purposes have been greatly reduced or completely overcome. Other objects and advantages of the invention will be apparent from the description thereof hereinafter.

In accordance with the present invention new and improved essentially non-aqueous or anhydrous compositions are produced by addition polymerizing at least one monoethylenically unsaturated monomer having a group $$H_2C=C<$$

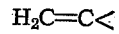

in a hydrocarbon medium consisting essentially of one or more aliphatic hydrocarbons containing dissolved therein an oil-soluble, i.e. a hydrocarbon-soluble polymer of a vinyl ester of a higher aliphatic acid, preferably saturated, having from 6 to 18 or more carbon atoms such as vinyl hexanoate, vinyl octanoate, vinyl laurate, vinyl oleate, vinyl stearate, vinyl decanoate, vinyl myristate, and vinyl palmitate. The oil-soluble polymer may be a homopolymer or a copolymer of at least two of these vinyl esters. It may also be a copolymer of at least 60% by weight, and preferably 70 to 99% by weight, of at least one of these vinyl esters of a higher fatty acid with at least one other ethylenically unsaturated monomer having a group of the formula $$H_2C=C<$$

including for example: styrene, vinyltoluene; vinyl ethers, such as vinyl methyl ether, vinyl ethyl ether, and vinyl butyl ether; acrylonitrile, methacrylonitrile, and $(C_1-C_3)$ esters of acrylic or methacrylic acid such as methyl acrylate or methacrylate, ethyl acrylate or methacrylate, and n-propyl or isopropyl acrylate or methacrylate; vinyl chloride vinylidene chloride; vinyl esters of saturated fatty acids having 1 to 7 carbon atoms, such as vinyl acetate or butyrate, ethylene, propylene, isobutylene, and so on. These copolymers may also contain substantial proportions from 1% to 30% by weight of such hydrophilic monomers as maleic anhydride, maleic acid, crotonic acid, fumaric acid, itaconic acid, acrylic acid, methacrylic acid, N-vinyl-2-pyrrolidone, N,N-di($C_1-C_4$)alkylamino ($C_2-C_6$)alkyl esters or the corresponding N-substituted carboxamides, or the corresponding vinyl ethers or vinyl sulfides, such as N,N-dimethylaminoethyl acrylate or methacrylate,- N-[N',N'-dimethylaminoethyl]-acrylamide or -methacrylamide, and dimethylaminoethyl vinyl ether or sulfide. The maximum permissible proportions of any comonomer permissible depends on its character, that is, its hydrophobicity or hydrophilicity. It must not be used in such large amounts as to render the copolymer insufficiently soluble in the hydrocarbon medium to be used in the subsequent production of the anhydrous polymer dispersion. Small amounts from about 0.1 to 0.8% by weight of a polyethylenically unsaturated monomer, such as divinyl benzene and ethylene glycol dimethacrylate may also be copolymerized with the vinyl ester of higher fatty acid with or without the other comonomers mentioned provided the amount used and the conditions of preparation of the precursor copolymer does not render the copolymer insoluble in the hydrocarbon medium.

The hydrocarbon liquids that may be employed in making the hydrocarbon-dispersed system may be a simple compound or a mixture of compounds. Thus, the hydrocarbon may be of aliphatic character, either acyclic or alicyclic, aromatic, or naphthenic, or the medium may be made up of a mixture of these various types of hydrocarbons. Examples of individual hydrocarbons that may be employed include propane, cyclopropane, butane, pentane, n-hexane, cyclohexane, n-heptane, n-octane, isooctane, benzene, toluene, xylene (o-, m-, or p-xylene). Commercially-available hydrocarbon mixtures may be employed such as mineral spirits, gasoline, xylene mixtures, terpenes, solvent naphthas of aromatic, aliphatic, or naphthenic character, alkyl benzenes in which the alkyl group or groups have from 1 to 4 carbon atoms, octane fractions which contain a mixture of octane isomers, and so on. Generally, it is preferred to employ a hydrocarbon liquid medium comprising at least 50% by weight of non-aromatic components, and especially those of aliphatic or paraffinic make-up. This preference has the advantage of lower cost and capacity to disperse a wide variety of polymers in the form of discrete particles.

The monomer or monomers that can be used to produce the addition polymer of the present invention which constitutes the main polymer therein, i.e. the polymer insoluble in the hydrocarbon medium but dispersed therein in the form of fine particles ranging in size from 0.05 to 10 microns and preferably from 0.1 to 2 microns, may be any monoethylenically unsaturated monomer which if used alone does not produce a polymer soluble in the hydrocarbon medium employed or if used with other monomers does not produce with the monomers used a copolymer soluble in such media. The dispersed polymer thus produced is essentially insoluble in the hydrocarbon medium by which it is meant that not over 10% by weight of the dispersed polymer is dissolved in the medium, and 90 to 100% by weight of the dispersed polymer is in the form of discrete particles having a size of 0.1 to 10 microns. Thus, the polymer dispersed in the hydrocarbon liquid medium may be formed by the polymerization of any one of a wide variety of monomers such as vinylidene chloride and the vinyl esters of fatty acids having from 1 to 18 carbon atoms including vinyl acetate, vinyl propionate, vinyl butyrate, vinyl laurate, vinyl oleate, and vinyl stearate. Esters of acrylic acid or of methacrylic acid with alcohols having from 1 to 18 carbon atoms may likewise be employed. Examples include methyl acrylate or methacrylate, ethyl acrylate, or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates. Acrylonitrile, methacrylonitrile, acrylamide, methacrylamide, styrene, α-methyl styrene, vinyltoluenes, acrylic acid, acrylic acid anhydride, methacrylic acid, methacrylic anhydride, fumaric acid, crotonic acid, allyl acetate, glycidyl methacrylate, t-butylaminoethyl methacrylate, hydroxyalkyl acrylates or methacrylates such as β-hydroxyethyl methacrylate, β-hydroxyethyl vinyl ether, β-hydroxyethyl vinyl sulfide, N-vinyl-2-pyrrolidinone, N,N-dimethylaminoethyl methacrylate, ethylene, vinyl fluoride, vinylidene fluoride, hexafluoropropylene, chlorotrifluoroethylene, and tetrafluoroethylene may also be used as the monomers for making the main polymer.

Preferred monomers include acrylonitrile and methacrylonitrile, acrylic acid, methacrylic acid, itaconic acid, and esters of these acids, especially of acrylic or methacrylic acids, with saturated alcohols having 1 to 4 carbon atoms, vinyl esters of acids having 1 to 3 carbon atoms, acrylamide, methacrylamide, vinyl chloride and vinylidene chloride. In general polymers and copolymers having any proportion of one or more of these several monomers produce polymers and copolymers which are adequately insoluble in the hydrocarbon solvent used. With these monomers, a minor proportion (up to 45% by weight of the copolymer) of a vinyl aromatic compound such as styrene, vinyl toluene or vinyl naphthalene and similar proportions of higher saturated alcohol esters of acrylic acid or methacrylic acid or of higher aliphatic vinyl esters such as those of the acids having from 4 to 18 carbon atoms may be used. For example, esters of alcohols having from 5 to 18 carbon atoms with acrylic acid or methacrylic, or the higher alcohol vinyl esters mentioned which tend to impart hydrocarbon solubility to copolymers produced therefrom may be used in conjunction with other monomers to the extent that the resulting copolymer does not become soluble in the particular hydrocarbon medium employed. Usually the content of vinyl aromatic compound should not be over about 25% by weight and the content of higher alkyl acrylate or methacrylate esters should not be over about 30% by weight unless large proportions of other comonomers which counteract the solubilizing tendency of the higher esters or vinyl aromatic monomers are included, examples being acrylonitrile, vinyl chloride and methacrylic acid. The monomer mixture to be polymerized may also contain small proportions of reactive monomers, such as 0.5 to 10% by weight of maleic anhydride, isocyanatoethyl acrylate, N-methylolacrylamide, or N-methylolmethacrylamide.

The polymerization is effected in a hydrocarbon medium which preferably consists essentially of liquid aliphatic hydrocarbons. A pure aliphatic hydrocarbon or a mixture of one or more may be employed. To the extent that any particular polymer produced is insoluble in the hydrocarbon medium resulting, the essentially aliphatic hydrocarbon may be modified by the incorporation of other solvent materials such as aromatic or naphthenic hydrocarbons and in certain instances the amount of such nonaliphatic component may attain as high as 49% by weight of the entire liquid medium. However, the liquid medium preferably consists essentially of aliphatic hydrocarbons and in general the compositions of the present invention contain less than 25% by weight based on the weight of the liquid medium of an aromatic hydrocarbon and often none at all.

It is essential that the hydrocarbon be of liquid character, but it may have a wide boiling range from a minimum of about −50° C. (in which case high pressures may be needed in the polymerization) to a maximum which may be as high as 520° C. For most purposes, the boiling point should be from about 75° C. up to about 200° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35° C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° to 300° C. However, for most purposes, it is preferred to employ liquids boiling in the range from about 50° C. to about 235° C.

The term "consisting essentially of" as used in the definition of the ingredients present in the liquid medium claimed is intended to exclude the presence of other materials in such amounts as to interfere substantially with the properties and characteristics possessed by the composition set forth but to permit the presence of other materials in such amounts as not substantially to affect said properties and characteristics adversely.

The stability of polymer dispersion obtained by polymerizing monomeric material in a hydrocarbon medium containing dissolved therein the polymerized vinyl ester of a higher aliphatic acid, which forms finely-divided particles of the main polymer insoluble in the medium but stably dispersed therein is apparently accomplished by virtue of dispersing action of the dissolved vinyl ester or more likely of a dispersing or stabilizing agent formed as a result of the grafting of a relatively small portion of the monomer (the major portion of which forms the main or dispersed insoluble polymer) on the vinyl ester polymer. The dispersing agent is thus considered to be formed in situ during the main polymerization and comprises in its molecule at least two distinct components each of polymeric size, one of which (formed of the polymer of the vinyl ester of higher aliphatic acid) is soluble in the hydrocarbon medium, and the other of which (formed by grafting on the first-mentioned component of monomer of the same or similar constitution relative to the composition of the main or dispersed polymer) is preferentially soluble in, or miscible with, the main polymer.

The formation of the dispersing agent is preferably effected in situ simultaneously with the main polymerization. Alternatively, the dispersing agent may be formed by a separate preliminary graft polymerization and then introduced into the main polymerization system.

To illustrate the need for the consideration of the particular monomer in selecting the hydrocarbon medium, when the polymer is formed largely of styrene, the hydrocarbon selected should be of acyclic aliphatic character in which the polymer is insoluble since hydrocarbon media having a large aromatic component would dissolve the polymer.

In the polymerization system of the present invention, involving in situ formation of the dispersing agent from the "dispersing agent precursor" or "precursor" (i.e. the polymer of vinyl ester of higher aliphatic acid), several variations in procedure may be employed. The most readily adaptable system which is also highly convenient to use is that of free-radical type polymerization. This type of polymerization employs a free-radical catalyst of azo or peroxygen type. Examples include benzoyl peroxide, lauroyl peroxide, acetyl peroxide, cumene hydroperoxide, paramenthane hydroperoxide, azodiisobutyronitrile, dimethyl azodiisobutyrate, and so on. Any of the free radical type catalysts which are soluble in the monomer or the hydrocarbon medium may be employed. Free-radical catalysts which are activated by means of amines such as triethylenetetramine and those activated by various salts such as cobalt naphthenate are suitable. In general, any free-radical catalyst that can be used for bulk or solution polymerization of the monomers herein enumerated can be employed in the present invention. The proportion of catalyst may be from 0.1% to 3% of the weight of monomer or monomers. The amount employed may depend on the method of addition and the molecular weight desired in the dispersed polymer. Of course, the catalyst may be added all at once or in portions at periodic intervals.

The precursor is dissolved in the hydrocarbon medium in a concentration of at least 1%, generally from 5 to 60% or more, preferably about 40 to 60% by weight. The entire amount of the hydrocarbon solvent that is to be present in the final composition may be used at the start, but, generally, it is preferred to use only a portion such as ½ to ¾ thereof and to dilute the product obtained. A free radical initiator for the polymerization may be added to the solution of the precursor in the hydrocarbon solvent or it may be added with the monomers. The precursor in the solution may be allowed to react with the initiator by allowing the mixture to stand at a temperature from room temperature to 125° C. for a period of several minutes to an hour or so before introducing the monomers. This apparently activates the precursor and causes it to react more extensively with the monomers. However, this activation step is not essential. The amount of initiator may be from 0.001% to 10% by weight based on the monomers, but it is preferably about 0.1 to 1% by weight on monomers. Any of the conventional free radical initiators may be used provided they have appreciable solubility either in the hydrocarbon medium or in the monomers. Examples include the peroxides, such as tert-butyl hydroperoxide and cumene hydroperoxide, and azo catalysts such as azodiisobutyronitrile.

The monomers may be added all at once to the precursor solution or any portion thereof may be initially added and the remainder added gradually over a period of 1 to 5 hours or so. Depending upon the particular monomers, the particular inhibitor and the amount thereof, the polymerization may be allowed to proceed at room temperature in which case the heat that develops may be removed or not as desired. However, heating and/or cooling of the polymerization medium may be employed so as to provide for effecting the reaction at any controlled temperature from room temperature up to about 125° C. Generally, with the peroxides as initiators, the preferred temperature is in the range of about 70° to 100° C., whereas with the azo catalysts the preferred range is about 75° to 80° C.

As in conventional polymerization procedures, a so-called "chaser" solution of the initiator in the solvent may be added at the end of the reaction and allowed to cause additional polymerization during a period of 1 to 5 hours or so. Variations in the order of addition of monomers may be employed. In general, the monomers may be mixed in the desired proportions before their addition to the polymerization medium comprising the solution of precursor. However, it may be desirable to add one of the monomers first and then add a second or other monomers later. For example, a sluggish monomer such as vinylidene chloride may be added first, followed by a faster monomer such as ethyl acrylate. Similarly, butyl acrylate may be followed by acrylonitrile. The addition of different monomers in succession may be resorted to for other reasons than merely to adjust for the different reactivity rates. It may be desired to polymerize one or more of the monomers initially and follow this with subsequent addition of one or more other monomers so that in effect a less homogeneous polymeric mixture is obtained.

The proportions of total monomer used are in the range of 80 to 95% by weight of the mixtures of the monomers and the precursor.

Essentially, the product is a dispersion of a mixture of polymers comprising in major proportion an addition polymer of the monoethylenically unsaturated monomer or monomers in the form of undissolved particles of about 0.05 to 10 microns and, in preferred embodiments 0.1 to 2 microns, in size. The dispersion is moderately stable to mechanical forces such as centrifugation. It is presumed that the stability results from the fact that the polymeric vinyl ester of higher aliphatic acid initially present or a copolymer thereof with a portion of the monomers used to make the main polymer provides an effective dispersing agent in the medium. The viscosity of the product at room temperature and 40% concentration in the hydrocarbon solvent in which it is produced ranges from 0.3 to 10 poises. In the preferred systems, the viscosity is in the neighborhood of about 1 to 3 poises at 40% concentration and room temperature. The minimum film-forming temperature of the composition varies from about −40° C. to 150° C., depending upon the particular monomers and precursor used.

It is believed that the product comprises a mixture of polymers including not only the polymer of vinyl ester of higher aliphatic acid as initially introduced into the polymerization medium but also polymers of the monomers with themselves and with each other and copolymers of the monomer or monomers with a portion of the aforesaid vinyl ester polymer initially introduced. Such products are extremely difficult to analyze and the proportions of unchanged vinyl ester polymer, simple polymers or copolymers of the monomers, and copolymers of the vinyl ester polymer with one or more monomers depend upon the particular vinyl ester polymer, the extent of activation by catalyst before introduction of the monomers, and the particular monomers and conditions of polymerization.

In many cases, as much as 50% of the initially introduced amount of polymerized vinyl ester of higher aliphatic acid remains as a component of the final composition. In other instances as little as 10% or as high as 90% of this vinyl ester polymer remains unchanged. However, the composition obtained is not the mere equivalent of a composition obtained by simply mixing the vinyl ester polymer initially used with a separately formed polymer or copolymer of the monomer or monomers used.

The stability of the dispersion as previously stated, depends apparently upon the formation in situ, during polymerization of the monomer or monomers in the presence of the polymer of vinyl ester of higher aliphatic acid, of an appreciable polymeric component which serves as a dispersing agent in the composition. Such dispersing agent may be dissolved in the hydrocarbon medium partly or wholly or it may be partly or entirely adsorbed on the surface of the individual polymer particles held in suspension in the medium.

As compared to compositions containing a natural or synthetic rubber such as of the butadiene or isoprene types, the compositions of the present invention have the advantage that they have no tendency to color on overbaking or to discolor or become embrittled in the coated or impregnated articles as a result of oxidation or exposure to ultra-violet light during weathering. In addition, anhydrous polymer dispersion systems based on oxidatively degraded rubbers as dispersing agent precursors require extremely careful control of the extent of oxidation. The products of the present invention require no such special step for the production of products having reproducible viscosity and improved coating characteristics such as adhesion and freedom from discoloration.

The polymer dispersions of the present invention may have concentrations varying from 1 to 55% or higher solids content. The compositions are dilutable to any desired concentration for application in the coating and impregnation of various substrates as well as for the formation of free films by casting techniques. The polymer dispersions may be employed for the impregnation and coating of textile fabrics, paper, paperboards, leathers, wood, metals, ceramics, concrete, bricks, stones, plaster, vinyl wall tile and flooring tile, linoleum, asphalt tile, and asbestos cement products, including siding and shingles.

The viscosity of the dispersion is easily controlled such as by the addition of an aliphatic hydrocarbon solvent which simply dilutes the dispersion or by the addition of a swelling agent for the polymer or by the addition of hydrocarbon-soluble polymers, natural gums and resins, or lyophilic clays, such as the fatty amine quaternary salt-modified bentonites or montmorillonites, colloidal silica, and fatty acid-modified silicates.

The polymer dispersions of the present invention are adapted to be modified by the incorporation of drying oils, waxes (hydrocarbon, chlorinated hydrocarbon, and ester types), pigments, fillers, dyes, as well as plasticizers and polymeric or resinous materials which are soluble in the hydrocarbon liquid vehicle, including fatty-acid modified shellac, gums, natural resins, waves, asphalt, bitumen, coal tar, cumaroneindene resins, epoxidized fatty oils, epoxy resins, silicone oils, such as polysiloxanes, organic solvent-soluble alkylated methylolated aminoplast resins, including the condensates of formaldehyde with urea, melamine, thiourea, benzoguanamine, and ethyleneurea, alkylated with an alcohol having 2 to 6 carbon atoms such as n-butanol. Among other materials that can be incorporated are the alkyd resins including oil-modified alkyds, organic solvent-soluble vinyl and acrylic resins with or without plasticizers, including plastisols obtained from polyvinyl chloride or copolymers of vinyl chloride and plasticizers therefor.

While the procedures disclosed hereinabove provide reasonably complete scope, nevertheless more specific details are included in some instances in the earlier applications of which the present application is a continuation-in-part and the disclosures of all of those applications are incorporated herein by reference.

The simplest and most practical procedure is that which has so far been emphasized herein, namely the formation during the main polymerization of the stabilizing agent by grafting on the polymer of vinyl ester of higher aliphatic acid in situ. However, a graft or block copolymer of the hydrocarbon-soluble polymer of vinyl ester of higher aliphatic acid with monomeric material of the same or similar constitution as that of the main polymer to be dispersed may be preformed and introduced into the hydrocarbon polymerization medium at the beginning of, during, or upon the conclusion of the formation of the main polymer, provided the polymerization system is strongly agitated, during and especially prior to and up to the time of adding the graft polymer.

To assist those skilled in the art to practice the present invention, the following modes of operation are suggested by way of illustration, parts and percentages being by weight and the temperaturees in ° C. unless otherwise specifically noted.

(1) A solution of 4.5 g. of polyvinyl stearate (mol. wt. 55,000), in 146 g. of mineral spirits is prepared and 0.1 g. lauroyl peroxide is added to the mixture in a suitable reaction vessel. The atmosphere in the vessel is swept with nitrogen and the reaction mixture is heated to 89° C. with agitation for one hour to introduce active sites into the polymer. It is then cooled to 30° C. Then 0.2 gram of benzoyl peroxide is dissolved in a mixture of 33 grams of methyl methacrylate, 65 grams of ethyl acrylate, and 2 grams of maleic anhydride, and the resulting mixture is added to the first mixture. The mixture obtained thereby is heated at 87° C. After the elapse of about one hour and seven minutes, a definite cloudiness showing the formation of polymer becomes evident. The heating of the mixture is continued at about 87° to 93° C. for another hour and 20 minutes, whereupon 0.2 gram of lauroyl peroxide dissolved in 2 grams of mineral spirits is added. After continued heating at 90° to 102° C. for three hours, another addition of $\frac{2}{10}$ gram of lauroyl peroxide in 2 grams of mineral spirits is made and heating is continued at 90° to 100° C. for another hour and 25 minutes at which time another addition of 0.2 gram of lauroyl peroxide in 2 grams of mineral spirits is made and heating is continued at 87° to 102° C. for another five hours and five minutes. During all of the heating, the atmosphere in the vessel is swept with nitrogen and the reaction mixture is continuously agitated. The product amounted to a total of 256.3 grams of a polymer dispersion having 37.3% solids in which there has been effected a 92.4% conversion of the monomer into the polymer. The dispersion is homogeneous having a slightly yellowish appearance. The dispersed insoluble polymer particles range in size from about 0.05 to 3.5 microns and 95% are smaller than 2 microns. No solid matter was left on a filter when filtering the dispersion and casting of the dispersion upon glass and metal plates produces clear films which are soft and tough and quite hydrophobic. The coating adheres will to metal but is separable from the glass as an integral film if dried under normal drying conditions up to about 100° C. However, the adhesion to glass is made quite strong by baking the coated glass plates for about 30 minutes at 150° C.

(2) Ten parts of a vinyl hexanoate/vinyl myristate (about 60%/40%) copolymer of mol wt. 200,000 is dissolved in 200 parts of a commercial octane (a mixture of various octane isomers) and 20 parts of dimethyl formamide is added. A solution of 0.4 part of benzoyl peroxide in 60 parts of acrylonitrile, 3 parts of maleic anhydride, and 27 parts of butyl acrylate is added followed by 0.02 part of dimethyl-para-toluidine. The mixture is stirred and heated to reflux temperature (79° C.). The polymer dispersion begins to form after a very short induction period and the reflux temperature rises to 82° C. after 40 minutes. A solution of 0.8 part of lauroyl peroxide in 20 parts of octane is added followed by 0.04 part of dimethyl-para-toluidine and the polymer dispersion is stirred and heated at reflux temperature for one hour. A solution of 0.8 part of lauroyl peroxide in 20 parts of commercial octane is added followed by 0.04 part of dimethyl-para-toluidine. The mixture is heated to reflux temperature for one-half hour (86° C.) and allowed to cool. The dispersion (particle sizes ranging from about 0.05 to 4 microns, 95% below 2.2 microns) forms a continuous film upon drying at 100° C. The film is quite hydrophobic and resistant to water.

(3) Ten parts of vinyl myristate/vinyl palmitate (about 60%/40%) copolymer of 300,000 mol. wt. is dissolved in 200 parts of commercial octane and a solution of 0.4 part of benzoyl peroxide in 45 parts of acrylonitrile and 45 parts of butyl acrylate is added. The mixture is stirred, 0.04 part of dimethyl-para-toluidine added, and heated to reflux temperature in a nitrogen atmosphere. After two hours the reflux temperature is 85° C. A solution of 0.4 part of lauroyl peroxide in 10 parts of commercial octane is added followed by 0.02 part of dimethyl-para-toluidine. Refluxing is continued for an additional hour at the end of which time the reflux temperature is 95° C. A mixture of 10 parts of dimethyl formamide and 22 parts of commercial octanes is added to the resulting polymer dispersion (particle sizes ranging from 0.05 to 2.5 microns) which is then formed by casting into a continuous film which is flexible, tough, and insensitive to moisture.

Dispersions are prepared in a similar manner substituting acrylonitrile (54 parts) and 2-ethylhexyl acrylate (36 parts) for the acrylonitrile-butyl acrylate monomer mixture of the above example. The dispersions produce films of similar character.

(4) Fifteen parts of a 10%/90% vinyl acetate/vinyl laurate copolymer of 70,000 ml. wt. is dissolved in 200 parts of commercial octane. To this is added 0.04 part of dimethyl-para-toluidine and a solution of 0.4 part of benzoyl peroxide in 85 parts of vinyl acetate. The mixture is stirred and heated to reflux temperature for four hours. A solution of 0.4 part of lauroyl peroxide in a mixture of 5 parts of crotonic acid and 15 parts of commercial octane is then added followed by 0.04 part of dimethyl-para-toluidine. After an additonal three hours of refluxing, a solution of 0.4 part of lauroyl peroxide in 10 parts of octane is added followed by 0.03 part of dimethyl-para-toluidine. Refluxing is continued for four hours and the resulting polymer dispersion is allowed to cool. The dispersed insoluble polymer particles range in size from about 0.05 to 3.5 microns and 95% are smaller than 2 microns. The poly(vinyl acetate) dispersion (particle sizes from 0.05 to 5 microns, 95% being in the range of 1 to 3 microns) forms continuous moisture-resistant films on casting at 50° C.

(5) Ten parts of a 30%/70% vinyl laurate/vinyl palmitate copolymer of 90,000 mol. wt. is dissolved in 210 parts of commercial octane and 0.066 part of lauroyl peroxide is added. The mixture is stirred and heated at 95° C. while a solution of 0.134 part of lauroyl peroxide in 90 parts of methyl acrylate is added slowly over the course of 2½ hours. The mixture is stirred and heated at 95° to 96° C. for an additional hour. A white polymer dispersion is obtained having particle sizes up to 2 microns. The poly(methyl acrylate) dispersion is sprayed on the back of a paper sheet and another paper sheet is then applied to the coated face. On drying, a grease-resistant laminate is obtained.

(6) Four parts of a 5%/95% butylacrylate/vinyl laurate copolymer of 30,000 mol. wt. and 0.1 part of benzoyl peroxide are dissolved in 75 parts of toluene and heated to 107° C. for 45 minutes. A mixture of 22.5 parts of ethyl acrylate and 22.5 parts of methacrylic acid is then added and the resulting solution is stirred and heated at 107° C. for five hours under pressure. A low viscosity polymer dispersion is formed having particle sizes ranging from 0.04 to 2 microns. Cellulosic yarns are warp sized by passage through this dispersion at room temperature after dilution with toluene to 15% polymer concentration. The size is readily removable on washing in a warm aqueous alkaline solution (0.5% $Na_2CO_3$).

(7) Ten parts of poly(vinyl laurate) of 150,000 mol. wt. is dissolved in 200 parts of commercial octane and 25 parts of toluene. This solution is heated to 95° C. with 0.4 part of lauroyl peroxide for one-half hour. A mixture of 20 parts of methyl methacrylate, 2 parts of methacrylic acid, and 60 parts of ethyl acrylate is then added and the temperature is raised to 95° to 96° C. with stirring. After about 15 minutes there was visible formation of a polymer dispersion. Then 8 parts of methacrylic acid is added and heating is continued for 3 hours at 95° to 97.5° C. A stable polymer dispersion results. The dispersion is coated on leather as a base-coat, forming a tough, adherent continuous coating receptive to a topcoating of lacquer type, such as a plasticized copolymer of vinyl chloride and vinyl acetate in acetone.

We claim:

1. A composition of matter comprising a substantially anhydrous dispersion, in a liquid essentially inert hydrocarbon medium having a boiling range from about −50° C. to 300° C. and consisting essentially of at least one member selected from the group consisting of aliphatic, aromatic, and naphthenic hydrocarbons, of an essentially linear addition polymer of monoethylenically unsaturated molecules which is essentially insoluble in the medium, not over 10% by weight of the dispersed polymer being dissolved in the medium and 90% to 100% by weight of the dispersed polymer being in the form of discrete particles having a size of about 0.1 to 10 microns dispersed in the medium by a hydrophobic polymeric dispersing agent consisting essentially of a component of polymeric size formed of a polymeric precursor which is soluble in the medium and a component formed of polymerized monomer molecules of essentially similar chemical constitution to that of polymerized monomer molecules in the dispersed addition polymer to render this latter component preferentially soluble in the dispersed polymer, the precursor being a hydrocarbon-soluble polymer of at least 70% by weight of at least one vinyl ester of an aliphatic acid having 6 to 18 carbon atoms.

2. A composition of matter comprising a substantially anhydrous dispersion, in a liquid essentially inert hydrocarbon medium having a boiling range from about −50° C. to 300° C. and consisting essentially of at least one member selected from the group consisting of aliphatic, aromatic, and naphthenic hydrocarbons, of an essentially linear addition polymer of monoethylenically unsaturated molecules which is essentially insoluble in the medium, not over 10% by weight of the dispersed polymer being dissolved in the medium and 90% to 100% by weight of the dispersed polymer being in the form of discrete particles having a size of about 0.1 to 10 microns dispersed in the medium by a hydrophobic polymeric dispersing agent consisting essentially of a component of polymeric size formed of a polymeric precursor which is soluble in the medium and a component formed of polymerized monomer molecules of essentially similar chemical constitution to that of polymerized monomer molecules in the dispersed addition polymer to render this latter component preferentially soluble in the dispersed polymer, the precursor being a hydrocarbon-soluble polymer of 70 to 100% by weight of at least one vinyl ester of an aliphatic acid having 6 to 18 carbon atoms, and said ethylenically unsaturated molecules being selected from the group consisting of vinyl esters of a fatty acid having 1 to 18 carbon atoms, esters of acrylic acid with an alcohol having 1 to 18 carbon atoms, esters of methacrylic acid with an alcohol having 1 to 18 carbon atoms, phenyl acrylate, phenyl methacrylate, acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate, hydroxyalkyl acrylates, hydroxyalkyl methacrylates, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, tetrafluoroethylene, lower alkyl vinyl ethers in which the alkyl group has 1 to 4 carbon atoms, p-methoxy-α-methylstyrene, vinylidene cyanide, esters of α-cyanoacrylic acid, α-trifluoromethylacrylonitrile, N,N-dialkylacrylamide, N,N-dialkylmethacrylamides, and itaconic acid esters.

3. A composition of matter comprising a substantially anhydrous dispersion, in a liquid essentially inert hydrocarbon medium having a boiling range from about −50° C. to 300° C. and consisting essentially of at least one member selected from the group consisting of aliphatic, aromatic, and naphthenic hydrocarbons, of a linear polymer of an ester of an acid of the formula

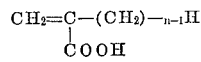

wherein $n$ is an integer having a value of 1 to 2 with an alcohol having 1 to 18 carbon atoms which is essentially insoluble in the medium, not over 10% by weight of the dispersed polymer being dissolved in the medium and 90% to 100% by weight of the dispersed polymer being in the form of discrete particles having a size of about 0.1 to 10 microns dispersed in the medium by a hydrophobic polymeric dispersing agent consisting essentially of a component of polymeric size formed of a hydrocarbon-soluble polymer selected from the group consisting of homopolymers and copolymers of at least 70% by weight of at least one vinyl ester of an aliphatic acid having 6 to 18 carbon atoms, and a component of polymeric size formed of polymerized monomer molecules of essentially similar chemical constitution to that of the polymerized ester molecules in the dispersed polymer to render this latter component preferentially soluble in the dispersed polymer.

4. A process for producing a dispersion of a polymer in a substantially anhydrous essentially inert liquid hydrocarbon medium which comprises addition polymerizing, at a temperature from room temperature to about 125° C., at least one monoethylenically unsaturated monomer, to form a polymer which is insoluble in the medium, in an anhydrous liquid hydrocarbon medium consisting essentially of at least one member selected from the group consisting of aliphatic, aromatic, and naphthenic hydrocarbons boiling in the range of about −50° C. to about 300° C. and containing a catalyst for the addition polymerization and at least 1% by weight of a precursor material selected from the group consisting of hydrocarbon-soluble polymers of 70 to 100% by weight of at least one vinyl ester of an aliphatic acid having 6 to 18 carbon atoms, to form a stable dispersion of solid polymer in the liquid hydrocarbon, the amount of catalyst being 0.1 to 3% of the weight of monomer and the proportion of total monomer being 80 to 95% by weight of the weight of monomer plus precursor material.

References Cited

UNITED STATES PATENTS

| | | | |
|---|---|---|---|
| 2,928,797 | 3/1960 | Brunson et al. | 260—28.5 |
| 3,072,492 | 1/1963 | Smith et al. | 260—28.5 |
| 2,617,780 | 11/1952 | Lutz | 260—33.8 |
| 2,799,669 | 7/1957 | Zoss | 260—33.8 |
| 2,953,541 | 9/1960 | Pecha et al. | 260—28.5 |
| 2,526,349 | 1/1951 | Brush. | |

OTHER REFERENCES

Warth: The Chemistry and Technology of Waxes, Rheinhold Publishing Corp., New York, p. 821, 1956.

ALLAN LIEBERMAN, *Primary Examiner.*

U.S. Cl. X.R.

260—34.2, 885, 901